United States Patent [19]

Bornstein

[11] 4,404,334

[45] Sep. 13, 1983

[54] THERMOSETTING RESINOUS POLYOL

[75] Inventor: Leopold F. Bornstein, Atlanta, Ga.

[73] Assignee: Georgia-Pacific Corporation, Atlanta, Ga.

[21] Appl. No.: 442,634

[22] Filed: Nov. 18, 1982

[51] Int. Cl.$^3$ .......................... C08G 8/24; C08G 8/28; C08G 8/04; C08G 8/10

[52] U.S. Cl. .................................... 525/504; 525/501; 528/129; 528/155; 528/157; 528/158; 521/181; 521/183

[58] Field of Search ................ 525/501, 504; 528/129, 528/155, 158, 157

[56] References Cited

U.S. PATENT DOCUMENTS

| | | |
|---|---|---|
| 2,035,515 | 3/1936 | Wilder . |
| 2,293,805 | 8/1942 | Cooke et al. . |
| 2,376,213 | 5/1945 | Watson et al. . |
| 2,728,741 | 12/1955 | Simon et al. . |
| 2,744,875 | 5/1956 | Thomas et al. . |
| 3,010,919 | 11/1961 | MacKinney et al. ............ 528/129 X |
| 3,043,794 | 7/1962 | Feller et al. . |
| 3,114,732 | 12/1963 | von Brachel et al. . |
| 3,156,670 | 11/1964 | Soldatos . |
| 3,185,654 | 5/1965 | Ball et al. . |
| 3,227,667 | 1/1966 | Moffitt et al. . |
| 3,247,135 | 4/1966 | Doughty . |
| 3,296,159 | 1/1967 | Lissner . |
| 3,384,618 | 5/1968 | Imoto et al. . |
| 3,506,599 | 4/1970 | Dean . |
| 3,519,581 | 7/1970 | Moorer et al. . |
| 3,577,358 | 5/1971 | Santelli et al. . |
| 3,598,771 | 8/1971 | Davis et al. . |
| 3,655,619 | 4/1972 | Sellet ................................ 525/504 X |
| 3,661,814 | 5/1972 | Smith et al. . |
| 3,705,146 | 12/1972 | Smith . |
| 3,725,349 | 4/1973 | Smith et al. . |
| 3,894,981 | 7/1975 | Kruglikov et al. . |
| 3,929,695 | 12/1975 | Murata et al. . |
| 3,931,072 | 1/1976 | Coyle . |
| 3,940,352 | 2/1976 | Wennerblom et al. . |
| 3,956,207 | 5/1976 | Blackmore et al. ............. 528/158 X |
| 3,957,703 | 5/1976 | Ludwig et al. ................. 528/158 X |
| 4,107,127 | 8/1978 | Shea . |
| 4,107,127 | 8/1978 | Shea . |
| 4,127,544 | 11/1978 | Allan . |
| 4,150,194 | 4/1979 | Watts et al. . |
| 4,195,151 | 3/1980 | Dunleay et al. ................. 525/504 X |
| 4,209,427 | 6/1980 | Williams . |
| 4,219,623 | 8/1980 | Sudan et al. . |
| 4,352,914 | 10/1982 | Tobinaga ............................ 525/504 |
| 4,358,570 | 11/1982 | Tobinaga ........................ 525/504 X |

*Primary Examiner*—Howard E. Schain
*Attorney, Agent, or Firm*—Schuyler, Banner, Birch, McKie & Beckett

[57] ABSTRACT

The present invention comprises a new phenolic-aldehyde based resinous, thermosetting polyol and a method for its production. According to the invention, phenol is condensed using acid catalysis, under freely evaporative atmospheric conditions with a molar excess of aldehyde, in the presence of polyhydroxyl component.

11 Claims, No Drawings

THERMOSETTING RESINOUS POLYOL

TECHNICAL FIELD

The present invention relates to new phenolic-aldehyde based resinous, thermosetting polyols and methods for their production.

BACKGROUND ART

Through the years, polyurethane foams have enjoyed widespread commercial acceptance. Procedures for producing both flexible and rigid foams are well-known. Flexible foams are used in furniture cushions, mattresses, carpet underlays, etc.; while rigid foams have been used primarily in thermal and acoustical insulation applications.

Polyurethane foams are typically prepared by reacting polyisocyanate and polyol in the presence of catalyst, emulsifying agents, and other additives such as foaming agents. Polyols generally used include synthethic materials such as polyethers and polyesters as well as natural polyols such as castor oil. A common characteristic of foams based on polyurethane is their poor resistance to heat and flame. This low heat and flame resistance is due, to a large degree, to the polyol component used in the foam's formulation. This characteristic of polyurethane foams is particularly disconcerting because many uses for these materials are in residential environments and structural applications.

Various approaches for improving the heat and flame resistance of polyurethanes have been tried. A principal approach has been to introduce flame and heat depressants or inhibitors based on halogen, phosphorous or nitrogenous compounds into the foam. While such materials do reduce polyurethane flammability, they unfortunately tend to exacerbate the evolution of toxic gases under high temperature decomposition conditions. For this reason, there is a strong need in the art for alternate techniques for improving the heat and flame resistance of polyurethanes.

It is well-known that phenolic resins have good heat and flame resistance. In Davis et al U.S. Pat. No 3,598,771 a method for incorporating such materials in polyurethane foams is disclosed as a way of upgrading the heat and flame resistance of polyurethanes. According to this patent, conventional novolac-type phenolic resins can be substituted for or preferably used in combination with the polyol component. The novolac resin is prepared in the conventional fashion to yield a thermoplastic polymer; i.e., a molar excess of phenol is reacted with formaldehyde (eg. 0.7-0.85 mole formaldehyde per mole phenol) under atmospheric reflux conditions in the presence of an acidic catalyst. The novolac resin is thereafter reacted with a polyisocyanante in the presence of emulsifier, blowing agent and catalyst. While significantly improved heat and flame resistance is described, foam production and properties are unavoidably compromised. Novolac resins are normally produced as solid, thereby making them difficult to disperse with polyisocyanate in the time necessary for good foam production. Consequently, the bulk of the novolac resin acts as a flame retardant filler rather than reacting with isocyanate. As a way of upgrading foam properties, novolac resin is blended with a conventional polyol, e.g., a polyether or a polyester. Unfortunately, this compromises the heat and flame resistance of the urethane produced.

It would be of great value, therefore, to provide a new class of phenolic-aldehyde based polyols which can be used to improve the heat and flame resistance of polyurethanes, while avoiding the above noted disadvantages of thermoplastic novolac resins.

It is an important object of this invention to produce a phenolic-aldehyde based resinous thermosetting polyol that can be reacted with isocyanates to produce urethane polymers with improved heat and flame resistance.

It is another object of this invention to produce a phenolic-aldehyde based resinous thermosetting polyol that is liquid under standard urethane reaction conditions.

It is a further object of this invention to produce a phenolic-aldehyde based thermosetting resinous polyol that has a high, controlled hydroxyl number, above about 400, making it ideally suited for urethane manufacture by reaction with isocyanates.

It is still another object of this invention to provide a phenolic-aldehyde based thermosetting polyol that can also be used as a plasticizer for conventional phenolic resins.

DISCLOSURE OF THE INVENTION

These and other objects are met by the present invention which comprises a phenolic-aldehyde based, resinous thermosetting polyol prepared by co-reacting in a first reaction step at substantially atmospheric pressure, at a temperature between 120° C. and 135° C. and under mildly acidic conditions a reaction mixture of:

(a) primary phenolic component
(b) substantially anhydrous aldehyde component, and
(c) polyhydroxyl component selected from the group consisting of: dihydric alcohols, polyhydric alcohols, and salts of a lignosulfonic acid said co-reaction being continued, while permitting volatile reaction constituents of the reaction mixture to evaporate freely therefrom, until the level of unreacted aldehyde component in the reaction mixture is below about 2%, by weight, to yield first step resin product, and thereafter reacting in a second reaction step, at substantially atmospheric pressure and under mildly acidic conditions, said first step resin product with secondary phenolic component.

Resinous thermosetting polyol produced by the above process can be advantageously used to produce improved heat and flame resistant polyurethanes, optionally foamed, or alternatively can be used as a plasticizer for conventional phenolic resins.

As used in the specification and claims, the phase "mildly acidic conditions" means a pH between about 4.0 and 7.0.

The phrase "substantially anhydrous" when used in the specification and claims means a water content below about 1.5 weight percent.

DETAILED DESCRIPTION

The present invention is based in part on the discovery that a resinous thermosetting polyol, having a relatively high, and controlled hydroxyl number, can be produced by a two step process using materials previously used for conventional phenolic resin production. The first step of this two step process involves the co-reaction of primary phenolic component, substantially anhydrous aldehyde component and polyhydroxyl component.

Any of the phenolic compounds commonly used in commercial resin production, for example: phenol, cresol, xylenol, hydroquinone, resorcinol, catechol and other alkylated or substituted phenolic derivatives, may be used as the primary phenolic component. When the resin is to be used for urethane production, however, standard phenol is preferred for obtaining the desired level of reactivity and rheological characteristics in the resin product. Generally, alkylated phenols are not used in this instance since their reactivity is relatively lower, their flame resistance not as good, and they tend to be more expensive than standard phenol. Similarly, resorcinol, hydroquinone, catechol and related compounds are also less preferred in this instance because of their excessive reactivity and high cost. In the broad practice of this invention, mixtures of commonly used phenolic compounds are also contemplated.

A substantially anhydrous aldehyde is employed in the present invention because the elevated temperature reaction conditions required by the first reaction step cannot be suitably maintained using an aqueous aldehyde solution. While an anhydrous formaldehyde, e.g., paraformaldehyde, is preferably employed as the anhydrous aldehyde component, other aldehydes such as acetaldehyde, propionaldehyde and furfural can also be used. Additionally, aldehyde mixtures may also be employed. The use of hexamine as a source of the anhydrous aldehyde is generally not preferred because of its alkaline nature and the unwanted release of ammonia that accompanies its use. The preferred paraform precursor is generally available in both powder and flake form, with the flake preferred because of its handling ease. Moreover, using a solid form of formaldehyde allows it to react gradually in the course of dissolving in phenol. Consequently, it reacts with intermediate phenolic compound rather than spontaneously reacting with the primary phenolic component alone. Polymers prepared by this gradual stepwise reaction show improved characteristics.

The polyhydroxyl component is selected from the group consisting of dihydric alcohols, polyhydric alcohols, the salts of a lignosulfonic acid and mixtures thereof. Dihydric alcohols or glycols suitable for use in the present invention include: ethylene, diethylene, triethylene, and polyethylene glycols; propylene and dipropylene glycols; 1,3-propanediol; 1,3- and 1,4-butanediol, and 1,5-pentanediol. Suitable polyhydric alcohols include: glycerol (glycerine); 1,1,1-trimethylolethane; 1,1,1-trimethylolpropane; pentaerythritol and sorbitol. Diethylene glycol is the preferred reactant because of its reactivity characteristics and low cost. Other dihydric and polyhydric alcohols useful in the present invention will be apparent to one of normal skill in this art.

As noted, it is also possible to employ the salts of lignosulfonic acid in place of or in combination with dihydric or polyhydric alcohol components. Suitable lignosulfonic acid salts include sodium, potassium, calcium, magnesium and ammonium salts. Sodium lignosulfonate is generally preferred because of its availability. The major source of these salts is the by-product or waste water stream produced during the sulfite-pulping process, in which a wood source is cooked under pressure in a solution of sulfurous acid and a bisulfite salt. The lignosulfonate salts are recovered from the waste pulp liquid as a light tan to dark brown powder and are stable in dry form.

According to the method of this invention, primary phenolic and anhydrous aldehyde components are co-reacted with polyhydroxyl component in the presence of a small amount of weak acid as the condensation catalyst. Generally, a weak organic acid or metal salt thereof will be used as the catalyst. A material particularly suitable for this purpose is zinc acetate. Other suitable catalysts include citric, lactic, boric, propionic, butyric, etc. acids and metal salts thereof. At low concentrations, these materials maintain the pH of the reaction mixture within the desired range of about 4.0 to 7.0 so as to suitably control the polymerization rate.

Contrary to standard novolac production, a molar excess of anhydrous aldehyde component is initially introduced into the first reaction step relative to the phenolic component. For example, in the case of formaldehyde and phenol reactants, about 1.2-1.6 moles of formaldehyde is introduced into the first step reaction mixture for every mole of phenol. The polyhydroxyl component is introduced in sufficient quantity into the reacting mixture so that resin with a desired level of reactivity and physical properties is obtained. For example, as the quantity of polyhydroxyl component introduced into the reaction mixture is decreased, reactivity of the resin decreases, and urethane polymer produced using the resin tends to be more brittle and friable. Conversely, as the amount of polyhydroxyl component is increased, reactivity of the resin increases, while the compressive strength of urethane polymers made from such resins decreases. Consequently, the quantity of polyhydroxyl component used in the reaction mixture depends on what properties are to be emphasized in the product. In the case of a phenol-formaldehyde-diethylene glycol reaction mixture for producing a polyol resin useful in polyurethane manufacture, about 0.1 to 0.4 mole of diethylene glycol for each mole of phenol is preferred. When using a lignosulfonate salt in place of glycol, the amount required is fixed by the need to supply a comparable level of available hydroxyl groups so as to impart a similar degree of reactivity into the resin. The hydroxyl number can be determined by the Acetic Anhydride-Pyridine Method and is defined as the number of milligrams of potassium hydroxide required for complete neutralization of the hydrolysis product of the fully acetylated derivative prepared from one gram of polyol. However, since the inherent viscosity of the lignosulfonates differs from the glycols, a compensating adjustment in the manufacturing procedure may be required to produce a resin with the desired physical properties.

The reaction mixture is processed under substantially atmospheric pressure conditions to allow unreacted constituents to evaporate freely therefrom (i.e. non-reflux conditions). Vacuum distillation is avoided at this stage since the aldehyde (e.g., formaldehyde) tends to evaporate too rapidly from the reaction mixture, yielding an insufficiently reacted polymer under the mild acidic conditions specified. Superatmospheric pressure conditions are also generally avoided as such conditions interfere with water removal from the reaction mixture and with gradual removal of aldehyde (e.g., formaldehyde) from the reaction mixture causing the phenol-aldehyde condensation reaction to progress too rapidly, excessively advancing the resinous polymer.

For similar reasons, the reaction is conducted at an elevated reaction temperature between about 120°–135° C. This is the reflux/distillation temperature range characteristic of the resin produced by the present process.

The first reaction step is continued until the level of unreacted aldehyde in the resin product is below about 2.0 weight percent, and preferably below 1.0 weight percent. This can be determined by titrating samples periodically withdrawn from the reaction mixture according to a known procedure. Generally, at the conditions specified, the first reaction step will be conducted for about 1 to 2 hours.

A unique and important feature of this invention is the provision for atmospheric distillation in the first reaction step so as to allow reaction constitutents (e.g., water, formaldehyde, etc.) to evaporate freely therefrom (i.e. non-reflux conditions). At the mole ratios of initial reactants specified, standard reflux distillation operation would result is a highly cross-linked, infusible resin referred to as resite. Such a product would be wholly unsuitable for urethane manufacture. However, by allowing aldehyde (e.g., formaldehyde) to be depleted by both reaction with intermediate phenolic compounds and by gradual evaporation from the reaction mixture, the mole ratio of reactants changes in a way that results in the formation of liquid, thermosetting resin that is ideally suited for urethane manufacture.

Under conditions of atmospheric distillation and elevated temperatures (120°–135° C.), any water contained in the reactant species or produced during the reaction itself is continuously removed from the reaction mixture. Typically resin with a moisture content of less than 1.5 weight percent is produced. At the end of the first reaction step it may be desirable to add a material, e.g., toluene, to the resin which facilitates the removal of the last traces of water by azeotropic distillation. This is particularly important if the resinous polyol produced by this invention is to be used in polyurethane production by reaction with isocyanates. As is well known, water will react readily with the isocyanate radical, producing $CO_2$, thereby depleting the isocyanates available for urethane bonding and impairing the production of foam with high closed cell content.

After the initial reaction step has proceeded to the desired degree, as indicated by the level of unreacted aldehyde in first step resin product, additional phenolic component is then added to first step resin product. This secondary component need not be the same phenolic material used in the first reaction step, and mixtures can also be used. By appropriately choosing phenolic reactants for the two steps, special characteristics in the final resinous polyol can be accentuated. For example, the introduction of alkylated phenols as the secondary phenolic component can improve resiliency; halogenated phenols can enhance the resin's heat and flame resistance; and cresols or resorcinols can reduce the resin's curing speed. Generally, when preparing resin for urethane manufacture phenol will be used as the secondary phenolic component because of the balanced reactivity level achieved in the resin when phenol is also used as the primary phenolic component, the simplicity of the resinification process and favorable economics.

First step resin-secondary phenolic component mixture is then reacted at substantially atmospheric pressure and under mildly acidic conditions. The reaction generally proceeds at between 110° C. and 120° C. Secondary phenolic component does not react directly with monomeric aldehyde, which has been substantially depleted during the first reaction step, but instead reacts with appropriate sites on the resin groups formed during the first step. While not wishing to be bound by any particular theory, it is believed that secondary phenolic component reacts with benzilic groups formed during the manufacture of the first step resin product. Moreover, secondary phenolic component is not only intended to crosslink with resinous phenolic groups already formed, but in the case of polyurethane production is also available for crosslinking with isocyanate groups.

The amount of secondary phenolic component added to first step resin product depends upon the physical properties desired in the resin, the desired reactivity of the resin, the type of isocyanante component used as the foam precursor, and the desired level of phenolic-isocyanate cross-linking. Generally, when preparing resin for urethane production, it is preferred to use about 0.2 to 0.6 mole of secondary phenolic component for each mole of aldehyde in the original mixture. Preferably, the final aldehyde-phenol molar ratio is within the range of 1.0 to 1.4. For example, when using phenol about 3 to 8% by weight of secondary phenolic component will be added, based on the original charge of first step reactants. Using too much phenol in resin prepared for urethane manufacture creates a blocking effect, that is the phenol tends to "block" the reaction between isocyanate groups and resinous hydroxyl groups preventing the desired degree of polymer chain growth. On the other hand, the use of a smaller quantity of phenol yields resinous polyol of lower reactivity and lower molecular weight. Since adding secondary phenolic component lowers resin viscosity, a short holding period at the elevated reaction temperature will generally follow the addition step in order to promote further polymerization and advance the resin to the desired viscosity.

As contrasted with standard novolac technology, resinous polyol produced by the above described process is a thermosetting resin in liquid form virtually solvent and water-free. This characteristic is particularly advantageous when the resin is used as the polyol reactant in producing polyurethane foams. Preferably, resin produced has a viscosity in the range of 3,000–50,000 cps. After the addition of secondary phenolic component, the viscosity can be increased to the desired level simply by advancing the resin at the elevated reaction conditions. Although thermosetting, the polyol is stable for relatively long periods of several months under ambient conditions without significant changes. The polyol has a relatively high hydroxyl number, greater than 400, making it ideally suitable for polyurethane production. Moreover, by observing controlled reaction conditions as required by this invention the hydroxyl number of the resinous polyol produced is consistently within a relatively narrow range. Consequently, when making polyurethane it is not necessary to make adjustments in the level of isocyanates in order to compensate for changes in the resin's reactivity level.

As noted above, the resinous polyol of this invention can be used to produce heat and flame resistant polyurethane. Preferably, the polyol is initially prepared using either a dihydric or polyhydric alcohol as the polyhydroxy component, since polyols with a higher hydroxyl number and more consistent reactivity are typically produced using these polyhydroxyl precursors. The polyol can be reacted with any di- or poly-functional organic isocyanate such as: toluene diisocyanate; 4,4'-diphenylmethane diisocyanate; hexamethylene diisocyanate; dianisidine diisocyanate; tolidine diisocyanate and m-xylene diisocyanate as is well-known in the art. Other iscyanate precusors will be apparent to those skilled in this art. Generally, sufficient isocyanate is used to yield about 0.9 to 1.2 cyanate groups per reactive hydroxyl group in the resin. Otherwise, the urethane polymer is prepared using conventional techniques and conventional additives such as emulsifiers, mixtures of polyols in addition to the resinous polyol of this invention and other commercial flame retardants if highly improved flame retardancy is desired. Any of the common catalysts, e.g., amines and metal salts, used in standard urethane production can be advantageously employed. If a foamed product is desired, the reaction will be conducted in the presence of a blowing agent. Suitable blowing agents include: water, a volatile hydrocarbon boiling below 110° C., and a halohydrocarbon boiling below 110° C. A particularly useful blowing agent is trichlorfluoromethane.

As noted before, the resinous polyol of this invention can also be used as a plasticizer for conventional phenolic resins and foams, both resoles and novolacs. As is well-known, fully-cured, conventional phenolic resins are generally very brittle and friable. The cured polyol of the present invention, on the other hand, is very resilient. Consequently, adding the resinous polyol of this invention to a conventional resole or novolac resin tends to reduce the brittleness and friability of the cured resin, with final resin properties depending upon the proportion of polyol used. Generally, about 10 to 50% by weight resinous polyol will be added to plasticize conventional phenolic resins, depending upon, the desired properties. When it is to be used as a plasticizer, the polyol is preferably prepared using a lignosulfonic acid salt as the polyhydroxyl component, since this significantly reduces the cost of the polyol resin as compared with resinous polyols formulated with dihydric and polyhydric alcohols.

The following example will serve to illustrate the process of this invention. It is presented for illustrative purposes only and is not intended to limit the scope of the present invention.

EXAMPLE

The reactor was initially charged with 55.92 lbs (25.36 kg) of phenol for every 9.32 lbs (4.23 kg) of diethylene glycol and 25.34 lbs (11.49 kg) of paraformaldehyde flake (91% formaldehyde). On a molar basis, this charge corresponds to 1.3 moles of formaldehyde and 0.15 mole of diethylene glycol for each mole of phenol. A small amount of zinc acetate, corresponding to about 0.002 lb (0.89 gram) for each pound of phenol charged, was then added to the reaction mixture to establish a pH of about 4.0 to 4.5. The mixture was then heated to a temperature between 120°–125° C. (248°–257° F.) and maintained under freely evaporative atmospheric pressure distillation conditions for 90 minutes using a horizontal water-cooled condenser to condense and separately collect evaporated species. During the reaction, water and formaldehyde was continuously and gradually removed by evaporation. Conducting the reaction for 90 minutes was sufficient to reduce the free formaldehyde content of the reaction mixture to less than 2.0 weight percent. The reaction mixture was then cooled to about 75°–85° C. (167°–185° F.) and about 0.116 lb of toluene (45.4 grams) was added for every pound of phenol in the original charge. Toluene facilitates the removal of the last traces of water from first step resin product by azeotropic distillation. The mixture was then vacuum distilled (25 in. of Hg) at a temperature between 100°–110° C. (212°–230° F.) for about 30 minutes. This period was sufficient to reduce the water content of the first reaction step resin product to less than 1.5 weight percent. At this time, secondary phenolic component was added to first reaction step resin product; about 0.07 lb of phenol (30.17 grams) was added for each pound of phenol initially charged. On a total molar basis about 1.21 moles of formaldehyde and 0.14 moles of diethylene glycol were used for each mole of phenol (both primary and secondary). The mixture was then heated to a temperature between 110°–120° C. (230°–248° F.) and the reaction was allowed to proceed until the liquid resin product reached the desired viscosity.

Thermosetting resinous polyol produced by the above procedure has a viscosity of 3,000–20,000 cps, a pH of 4.0–4.5, less than 1.5% (by weight) free formaldehyde, less than 1.5% (by weight) water and between 17% and 19% (by weight) free phenol. The resin has no detectable level of unreacted glycol indicating that it is completely bound within the resin. The resin has a hydroxyl number in the range of 450–550 as determined by the Acetic Anhydride-Pyridine Method, and a stability at ambient conditions of several months.

While preferred embodiments of this invention have been discussed herein, those skilled in the art will appreciate that changes and modifications may be made without departing from the spirit and scope of this invention, as defined in and limited only by the scope of the appended claims.

I claim:

1. A method for producing phenolic-aldehyde based resinous thermosetting polyol by
   (a) co-reacting in a first reaction step at substantially atmospheric pressure, at a temperature between about 120° C. and 135° C. and under mildly acidic conditions a reaction mixture of:
      (i) primary phenolic component,
      (ii) substantially anhydrous aldehyde component, and
      (iii) polyhydroxyl component selected from the group consisting of: dihydric alcohols, polyhydric alcohols and salts of a lignosulfonic acid;
   (b) continuing said co-reaction, while permitting volatile reaction constituents of the reaction mixture to evaporate freely therefrom, until the level of unreacted aldehyde component in the reaction mixture is below about 2.0 weight percent; and
   (c) thereafter reacting in a second reaction step at substantially atmospheric pressure, and under mildly acidic conditions a secondary phenolic component with said first step resin product.

2. A method according to claim 1 wherein the primary phenolic component is selected from the group consisting of phenol, cresol, xylenol, catechol, resorcinol, hydroquinone and alkylated phenols.

3. A method according to claim 2 wherein the secondary phenolic component is selected from the group consisting of phenol, cresol, xylenol, catechol, resorcinol, hydroquinone and alkylated phenols.

4. A method according to claim 1 wherein the anhydrous aldehyde component is selected from the group consisting of paraformaldehyde, acetaldehyde, propionaldehyde and furfural.

5. A method according to claim 1 wherein the polyhydroxyl component is selected from the group consisting of: ethylene glycol, diethylene glycol, triethylene glycol, polyethylene glycol, propylene glycol, dipropylene glycol, 1,3-propanediol, 1,3-butanediol, 1,4-butanediol, 1,5-pentanediol, glycerol, 1,1,1-trimethylolethane, 1,1,1-trimethylolpropane, pentaerythritol and sorbitol.

6. A method according to claim 1 wherein the primary phenolic component is phenol, the anhydrous aldehyde component is paraformaldehyde and the polyhydroxyl component is diethylene glycol.

7. A method according to claim 6 wherein the secondary phenolic component is phenol.

8. A method according to claim 6 wherein the first step reaction mixture initially has about 1.2 to 1.6 moles of formaldehyde per mole of phenol.

9. A phenol-aldehyde based resinous thermosetting polyol produced by the method of claim 1 or 6.

10. A urethane polymer formed by reacting the phenol-aldehyde based resinous thermosetting polyol of claim 9 with a di- or polyfunctional organic isocyanate compound.

11. A plasticized acid or base catalyzed phenolic resin containing the phenol-aldehyde based resinous thermosetting polyol of claim 9.

* * * * *